US011144499B1

(12) United States Patent
Mostak (10) Patent No.: US 11,144,499 B1
(45) Date of Patent: *Oct. 12, 2021

(54) METHOD FOR LOGGING UPDATE QUERIES

(71) Applicant: OmniSci, Inc., San Francisco, CA (US)

(72) Inventor: Todd L. Mostak, San Francisco, CA (US)

(73) Assignee: Omnisci, Inc., San Francisco, CA (US)

( * ) Notice: Subject to any disclaimer, the term of this patent is extended or adjusted under 35 U.S.C. 154(b) by 320 days.

This patent is subject to a terminal disclaimer.

(21) Appl. No.: 15/895,997

(22) Filed: Feb. 13, 2018

Related U.S. Application Data

(63) Continuation of application No. 14/721,687, filed on May 26, 2015, now Pat. No. 9,892,125.

(60) Provisional application No. 62/002,188, filed on May 23, 2014.

(51) Int. Cl.
*G06F 16/13* (2019.01)
*G06F 16/23* (2019.01)

(52) U.S. Cl.
CPC .............. *G06F 16/13* (2019.01); *G06F 16/23* (2019.01)

(58) Field of Classification Search
CPC ........................ G06F 11/1471; G06F 17/30864
See application file for complete search history.

(56) References Cited

U.S. PATENT DOCUMENTS

| 2004/0193622 | A1* | 9/2004 | Peleg | G06F 16/27 |
| 2007/0067567 | A1* | 3/2007 | Jiao | G06F 12/0844 |
| | | | | 711/118 |
| 2012/0204060 | A1* | 8/2012 | Swift | G06F 11/1435 |
| | | | | 714/15 |

* cited by examiner

*Primary Examiner* — Irete F Ehichioya
*Assistant Examiner* — Ken Hoang
(74) *Attorney, Agent, or Firm* — Innovation Partners; Charles E. Gotlieb (57) ABSTRACT

A system and method logs update queries by epoch, including at checkpoints performed at various times.

4 Claims, 3 Drawing Sheets

METHOD FOR LOGGING UPDATE QUERIES

RELATED APPLICATIONS

This application is a continuation of application Ser. No. 14/721,687 entitled "Method for Logging Update Queries" filed on May 26, 2015 by Todd L. Mostek, which claims the benefit of U.S. Provisional Patent Application Ser. No. 62/002,188 entitled, "A DISTRIBUTED MASSIVELY PARALLEL SYSTEM FOR DATA RETRIEVAL, COMPUTATION AND VISUALISATION OF LARGE DATASETS AND POTENTIAL INTEGRATION OF A DISTRIBUTED PARALLEL SHARED QUERY EXECUTION ENGINE" filed by Todd Mostak on May 23, 2014, each having the same assignee as the present application and each is hereby incorporated by reference in its entirety.

FIELD OF THE INVENTION

The present invention is related to computer hardware and software and more specifically to computer hardware and software for storage of computer data.

BACKGROUND OF THE INVENTION

Current methods of storage of computer data are suboptimal. What is needed is a method for storage of computer data.

SUMMARY OF INVENTION

A method evaluates the queries that have been queued since the last cycle: If any of the pages needed for evaluation are not in the buffer pool, read the page defined by PAGE_ID to which is appended the largest epoch sub-key. If any of the transactions executed over a horizontal partition involve writes (updates) to that partition, a Boolean dirty flag is set in the MANYCORE device's memory for each column that was edited.

At the end of executing all outstanding queries for a particular cycle, all queries that are updates that were executed in that cycle are recorded in a log file. Any variables that are evaluated at runtime, such as the SQL 'NOW', are replaced with the actual values they had at run-time (i.e. "NOV 19 2013 10:34:33 AM"). Finally, "COMMIT" is written to the log file. This log file is then flushed to stable storage, signifying a commit of those queries.

At any time during the cycle, if a page of memory flagged as dirty needs to be flushed to stable storage for whatever reason (typically if the buffer pool needs to evict it to bring in another page, at checkpoints (described below), or in the case of asynchronous writes of dirty pages to disk (described below), the system does not overwrite the existing page of memory on disk (hereby called the stable page) but rather writes a shadow copy of that page alongside the stable copy. The shadow copy is written to the file designated by the filename: value of PAGE_ID appended with the epoch sub-key of epoch+1.

At any time during the cycle after all queries are evaluated for that cycle) at periodic or occasional checkpoints, the system executes the following steps in sequential order: (i) all dirty pages in the buffer pool are flushed to disk in the shadow copy approach outlined above; (ii) The epoch counter is then incremented by 1; (iii) CHECKPOINT and the value of the epoch counter are flushed to stable storage, and a new epoch/cycle begins.

DETAILED DESCRIPTION OF A PREFERRED EMBODIMENT

Figure 1:
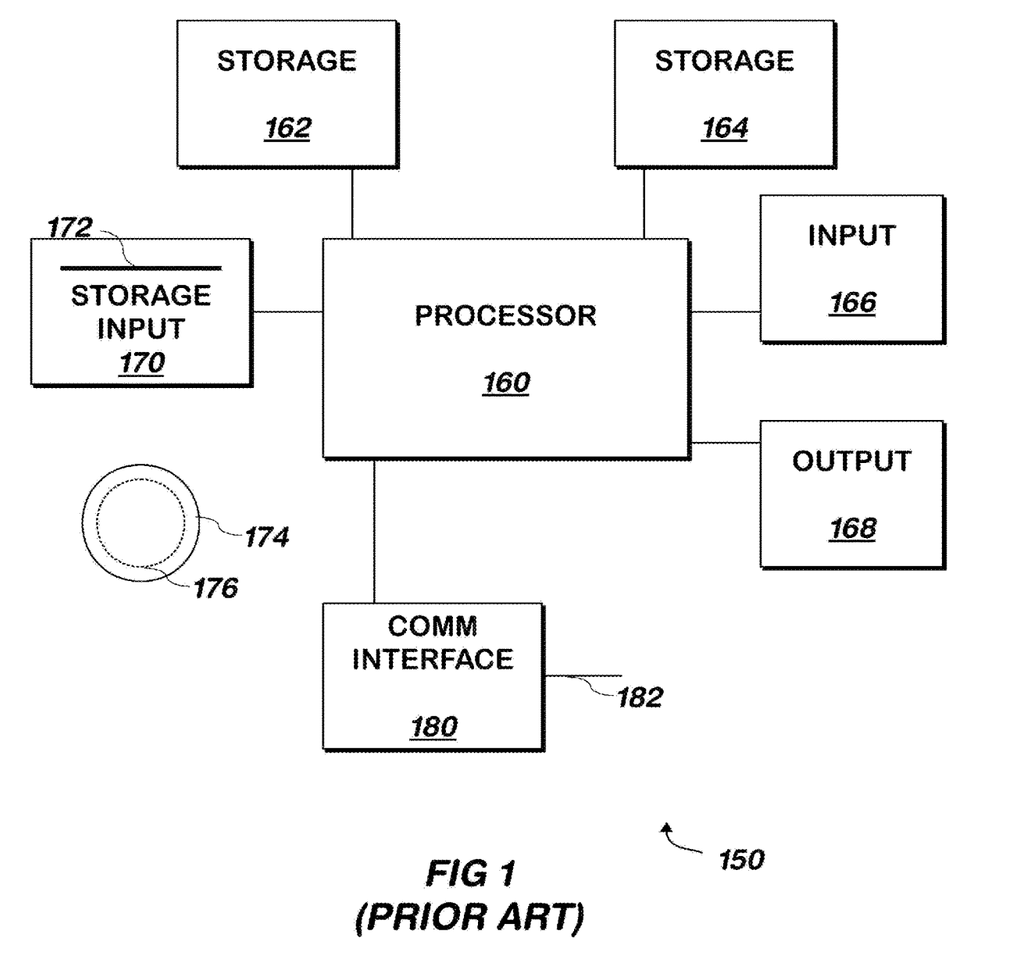
FIG. 1 is a block schematic diagram of a conventional computer system.

The present invention may be implemented as computer software running on a conventional computer system, computer software embodied on a non-transitory storage media, or otherwise. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. All storage elements described herein may include conventional memory and/or disk storage and may include a conventional database. All elements of a system include any or all of at least one input, at least one output and at least one input/output. Other system elements may include a conventional processor.

Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS T SERIES SERVER running the ORACLE SOLARIS 11 or higher operating system commercially available from ORACLE CORPORATION of Redwood Shores, Calif., a PENTIUM-compatible personal computer system such as are available from DELL COMPUTER CORPORATION of Round Rock, Tex. running a version of the WINDOWS operating system (such as XP, VISTA, 7 or 8) commercially available from MICROSOFT Corporation of Redmond Wash. or a Macintosh computer system running the OS X operating system commercially available from APPLE INCORPORATED of Cupertino, Calif. and the FIREFOX browser commercially available from MOZILLA FOUNDATION of Mountain View, Calif. or INTERNET EXPLORER browser commercially available from MICROSOFT above, although other systems may be used. Each computer system 150 may be a SAMSUNG GALAXY S5 commercially available from SAMSUNG ELECTRONICS GLOBAL of Seoul, South Korea running the ANDROID operating system commercially available from GOOGLE, INC. of Mountain View, Calif. Various computer systems may be employed, with the various computer systems communicating with one another via the Internet, a conventional cellular telephone network, an Ethernet network, or all of these.

Herein we describe a massively parallel system for data retrieval, computation and visualization of large datasets potentially distributed over multiple nodes, each with multiple compute devices ("the proposed system"). This system can systematically prioritize data-parallelism over task-parallelism, thus simultaneously and efficiently exploiting the superscalar architecture of the targeted compute devices while avoiding the performance losses associated with maintaining consistency while writing and reading shared resources (i.e. data).

Most modern compute devices, including ARM, X86, Graphics Processing Units and Intel Phi are superscalar to varying degrees. A superscalar processor can execute multiple non-interdependent instructions per cycle, although typically without the independent control architectures that are associated with a processing core in the true sense of the term. Typically such architectures are referred to as SIMD (Single Instruction, Multiple Data), since only one instruction can be dispatched for a certain number of computational sites (typically known as Arithmetic Logic Units), disallowing divergence. NVIDIA CORP. in turn calls their architecture SIMT (Single Instruction Multiple Threads), in reference to the fact that execution units (CUDA cores) executing the same instruction pipeline can be programmed as if first-class threads that allow for divergence, even though such divergence is in some sense an illusion—the underlying hardware still serializes the divergent branches, with the concomitant performance penalty.

Such architectures (whether SIMD or SIMT) discourage task-parallelism as they run most efficiently when computational resources are executing the same instruction. Although individual SIMD/SIMT sites (ALUs) within such an architecture can execute concurrently, allowing the potentially thousands of threads that such architectures can spawn to manipulate the same data elements typically carries a severe performance penalty.

Divergent execution can be costly in many ways. One such cost is the actual investment (be it monetary, die space, watts consumed, or programming hours) in MIMD (Multiple Instructions, Multiple Data) architectures (i.e. typical CPUs when not taking advantage of their superscalar capabilities) that is consumed in supporting free divergence between threads. For the same amount of money, die space or watts it is possible to purchase a compute device that supports only SIMD/SIMT parallelism that would enable much greater parallelism, however, at the cost of being less tolerant of divergent code paths.

The costs of divergent execution are not just confined to hardware inefficiencies. In data processing, issuing multiple read and writes to the same dataset typically requires not only locking but extensive transactional logging to ensure serialize-ability of transactions. Furthermore, divergent execution over partitioned datasets on multiple nodes, as is necessary to handle extremely large datasets, is significantly slowed when trying to ensure data consistency over an unreliable network in the face of unpredictable execution patterns on each node.

The system described below takes a novel approach to performing massively parallel distributed computations over extremely large datasets, systematically favoring deterministic data-parallelism over task-parallelism at every level, thus avoiding the costs of divergent parallel data processing and maximizing system throughput.

Anatomy of a Distributed Parallel Query Execution Engine

One aspect of the proposed system may be a distributed parallel query execution engine ("system engine"), which may consist of a shared-nothing cluster of "N" machines, each with "C" CPUs and "M" MANYCORE (i.e. GPUs, Intel Phis) devices. In addition, each machine can be networked to other machines using a network device, potentially located on each PCI root complex (typically one per CPU) or on each individual MANYCORE device. A node might have at least one CPU but is not required to have any MANYCORE devices, although the usage of MANYCORE devices typically leads to a significant performance boost.

See FIG. 1 of the related application, the first figure of the related application or all figures of the related application.

Each physical machine or node can be partitioned into "L" logical nodes.

Figure 2:
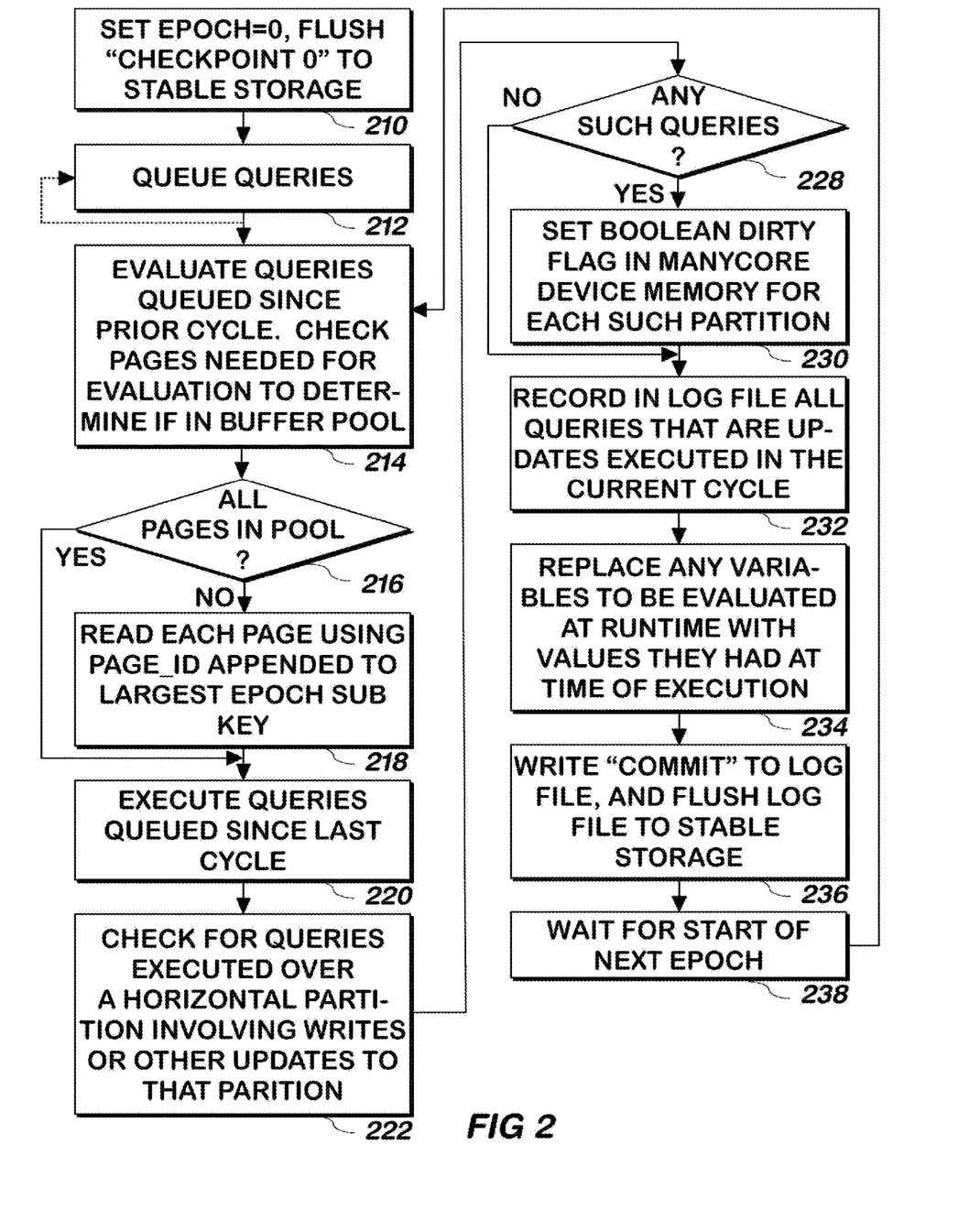
FIG. 2 is a flowchart illustrating a method of logging update queries according to one embodiment of the present invention.

See FIG. 2 of the related application, the second figure of the related application, or all of the figures of the related application.

A logical node in the case of the proposed system ("logical system node") consists of some set of data partitions on disk, access to the network interface (possibly shared), maybe one CPU core, and potentially one or more MANYCORE devices. Note that a logical instance of the proposed system can be responsible for its own partitions of a distributed dataset, although the partitions can be swapped and merged between logical system nodes at any time. Note that two or more logical system nodes housed on different CPU sockets in the same physical node can and would most likely communicate using a networking solution (such as INFINBAND) rather than traversing the QPI bus which connects the two CPU sockets—among other benefits this avoids unpredictable latencies associated with traversing the QPI bus while also allowing the use of protocols such as GPU RDMA. Unless noted otherwise noted, in the discussion below, a "proposed system node" or a "system node" or a "node" describes a logical system node.

Figures 3, 4:
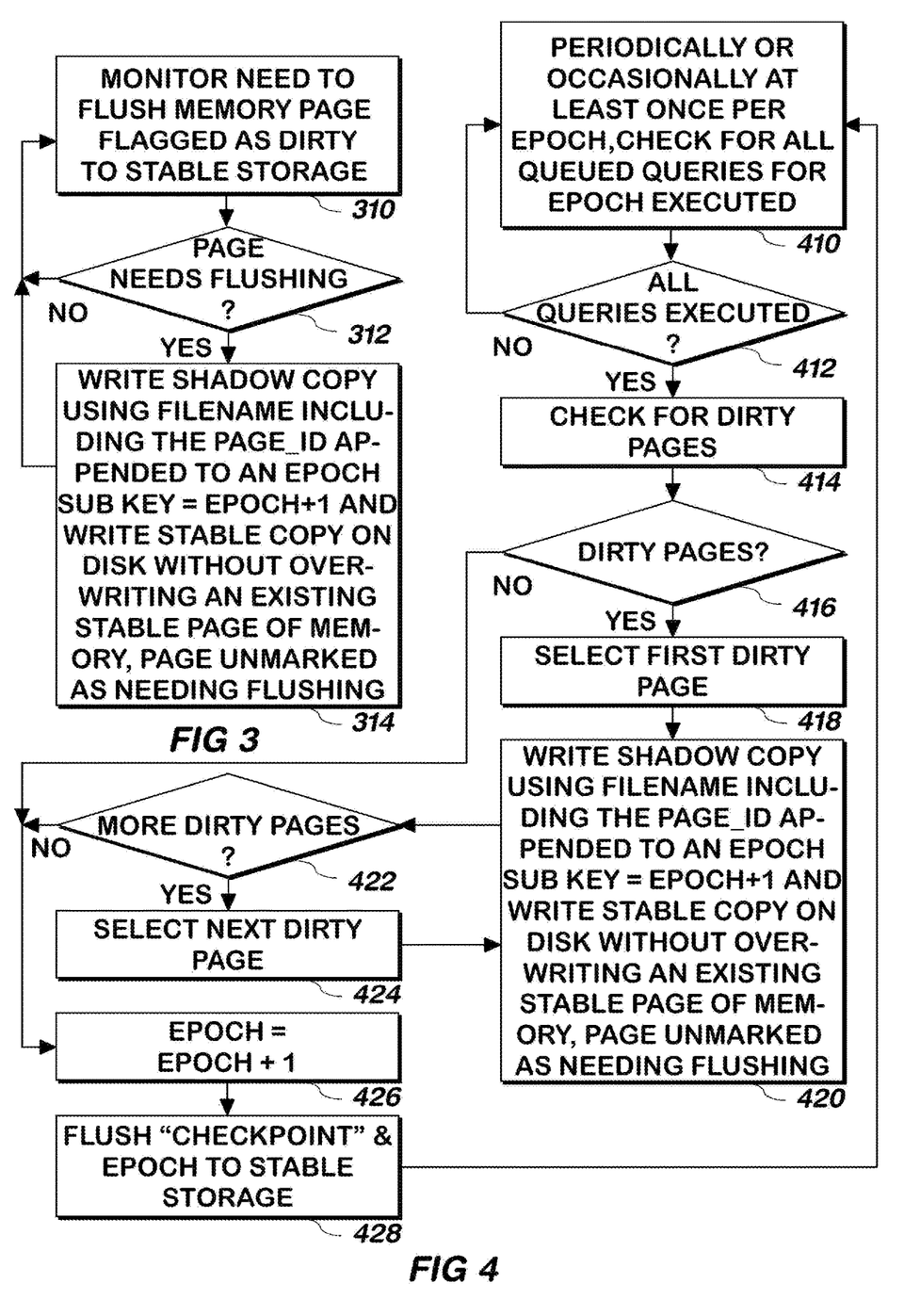
FIG. 3 is a flowchart illustrating a method of flushing one or more pages of memory to stable storage according to one embodiment of the present invention.
FIG. 4 is a flowchart illustrating a method of writing dirty pages to memory according to one embodiment of the present invention.

See FIG. 3 of the related application, the third figure of the related application, the second to last figure of the related application or all of the figures of the related application.

Data Partitioning

Data partitioning can occur on both an inter-node and an intra-node basis (referring to logical nodes). Data can be partitioned horizontally between logical nodes (inter-node) into what is called "sub-tables" on a variety of bases. For reasons set out below, an optimal partitioning technique to reduce possible skew in data distribution skew between nodes might be a round-robin or hash-based implementation. This has the added value of allowing for statistical querying if desired, since the distribution of data on any one logical node should approximately mirror the distribution over the cluster. Similarly, data can be partitioned horizontally intra-node. However, unlike sub-tables, tuples are typically allocated to these partitions using some sort of range-partition (possibly on more than one variable, such as on <x,y> coordinates). Examples of range based partitioning methods that can be used are, among others, linear (filling one horizontal partition at a time in insert order), BTREE for one-dimensional data, and QUADTREE or RTREE for spatial data. Alternatively, incoming data can be partitioned based on machine learning applied to historical queries. The proposed system can, for example, partition data spatially by clustering the spatial bounds of queries in a way that minimizes unneeded reads while keeping partitions big enough so as to maximize throughput. The proposed system can also use query history and the statistical distribution of data to determine the optimal way to partition data. For example, if time is the only predicate commonly used to query a certain table, then it might make sense to partition on this variable.

While in general it is thought to be advantageous to partition large tables redundantly over all nodes in the cluster, the proposed system also allows for placing a redundant copy of a table on all nodes or just on one node (with redundant backup of course on another node). The first case is particularly useful when joining large tables distributed across the cluster with small tables (such as attribute information by state), and the second might be useful for small tables to avoid inter-node communication overhead to get a complete result set for such a small table, which might dwarf the time it would just take to compute the result on one node. For the latter case, a logical system node can allocate some proportion of computational resources (i.e. by earmarking one multiprocessor in an NVIDIA card) away from calculating results for distributed tables and so as to asynchronously answer queries for small tables allocated locally.

Partitioning, both inter-node and intra-node, can lead to multiple performance advantages, to be outlined below.

See FIG. 4 of the related application, the fourth Figure of the related application, the last Figure of the related application or all of the figures of the related application.

Redundancy

Typically, the tuple set that comprises a given inter-node partition can be stored on two or more nodes. This can be accomplished by hashing out a tuple on insert to multiple system nodes. Multiple versions of the same tuple set can be stored in multiple ways, such as partitioning a tuple set spatially on one node and by time on another. Alternatively, a tuple set might be stored in column format on one node and row format in another. This allows for the database to choose the most optimal way of accessing a given subset of tuples depending on the query. If one node happens to crash or otherwise lose its data, it can restore from other system nodes in the cluster that store the same data. It is important to note that in this case, to ensure fault tolerance a tuple set may need to be redundantly stored on at least two physical nodes, as the fate of two logical system nodes on the same physical machine is highly intertwined.

Shared Query Execution (or Shared Scans)

SIMD/SIMT architectures typically exhibit a vast disparity between computational bandwidth and memory bandwidth as opposed to traditional SIMD/MIMD architectures. For example, without using the superscalar capabilities of modern Intel Xeon X86 chip (i.e. not leveraging the chip's vector instruction sets such as AVX/MMX), computational bandwidth for a 3.4 GHz 8-core Xeon socket may be 27.2 GFlops (3.4*8) and memory bandwidth, using 1600 GHz DDR3 RAM, would be 51.2 gigabytes a second. Alternatively, a modern NVIDIA CORP. GPU might have a computational throughput (single precision) of 5121 GFlops and 336 GB/sec of memory bandwidth. Assuming a given operation requires multiplying two single-precision (4-byte) floating point numbers stored in DRAM and storing the result to a local register, the Xeon processor could actually compute 6.4 billion such operations per second (51.2 GB/sec/8 bytes read per operation), or 6.4/27.2→23.52% compute efficiency, while the NVIDIA CORP. GPU could compute 42 billion operations per second at 42/5121→0.82% efficiency. This means that a method to somehow reuse memory accesses for multiple computations could only lead to a ~4.25× speedup in the case of the Xeon processor, but a ~122× speedup in the case of the NVIDIA CORP. GPU.

There is a much greater impetus for finding ways to reuse memory accesses with MANYCORE devices and concomitant architectures. (Note again that the potential gains would increase significantly for the Xeon processor if one leverages its superscalar capabilities, embodied in the AVX instruction set, which allows for 8 FLOPs per cycle.) In fact, the differential between computational throughput and the limit of memory-bandwidth bound throughput can be seen as the headroom a given scan/execution kernel has to add additional queries and hence computational load to the same workload with little or no cost.

With the foregoing in mind, the proposed system can use a shared scan/shared query execution approach—the idea being to evaluate multiple queries/operations for every read of data needed by all queries/operations. For example, if two queries enter the system, one being (a*b−2) and the other being (a+b−3), where "a" and "b" are variables/attributes in a relational dataset, the proposed system might only read the values a and b once for each tuple, storing the values in fast local register memory, and then executing the two different queries on the local register values, alleviating global memory congestion and theoretically nearly doubling throughput for operations that are heavily memory-bound. Note that although the proposed system can execute many queries per row or tuple, the queries are serialized for each row, leading to benefits that will be described below. Also note that since our system typically stores its data in columnar format, it can efficiently read only the variables/attributes needed by queries sharing a scan of the database while ignoring those that are not needed. In highly superscalar architectures, the use of shared scans can increase performance by orders of magnitude, depending on the set of queries. It is effectively generating high arithmetic intensity operations out of batches of low-arithmetic intensity operations, generating a workload more suited to the unique computational characteristics of MANYCORE devices.

One challenge of issuing multiple simultaneous queries on the same data scan is that result space needs to be reserved for each query. Increasing the size of the output buffer to accommodate many simultaneously executed queries can increase cache misses. There are various levels of caches on MANYCORE devices—both hardware and user managed. Note that cache misses may not increase linearly with additional numbers of queries—if the output buffers for these additional queries still fit within a given level of cache, there in fact may be no additional cache misses at all.

Not every query will touch the same data. Some queries may run on completely disjoint datasets (i.e. on different tables), and grouping these queries together only increases average query response times (i.e. latency) while giving no improvement to throughput. Alternatively, certain queries may need to scan some of the same columns (i.e. attributes) of data while not others—their data footprints may only partially overlap.

To handle the two abovementioned factors (the potential for increased cache misses with additional queries and the problem of disjoint data footprints), the proposed system utilizes a unique shared execution framework composed of horizontal range-based partitioning and an optimizing shared scheduler. In addition to the typical benefits associated with horizontal range partitioning (i.e. less data needs to be scanned for queries that filter on the same attributes on which the data is partitioned, and less total global memory needs to be reserved for query output—reducing the possibility that a query could not be evaluated to do a lack of memory), such partitioning works to decrease cache footprint for the output buffers written to by the shared scan. This works in two ways. First, all things being equal, a query that histograms data on the partition attribute will write to a smaller output buffer for each partition and thus its writes can be cached more aggressively. Second, since many queries may not need to touch all horizontal partitions that in union comprise a full table, and since most queries will have somewhat disjoint output bounds, less queries of the entire set scanning a particular table will need to be evaluated for each horizontal partition, hence reducing the memory footprint for output buffers.

As mentioned above, the proposed system may also include a scheduler that, for each horizontal partition, organizes the outstanding queries that need to read and/or write data from/to that partition into concurrent execution batches, and then finally determines the order in which to execute each batch from the total set of batches spanning all partitions. The scheduler can use a modular optimization framework to make these decisions, attempting to maximize the output of a parameterizable Quality of Service (QOS) function. To evaluate QOS, each query is assigned a function that evaluates client satisfaction as a function of response time. Typically, such a function has a flat (0-slope) maxima from 0 to some number of milliseconds, taking into account the bandwidth and latency of the connection to the client as well as the client's ability to process data sent to it, all of which are determined by a quick benchmark started when the client first connects to the system and updated either periodically or after every query. For a client with a slow connection, even a query that takes no time to evaluate on the server may lead to less than maximum client satisfaction as the client will have to wait for the query and response to be transmitted between client and server. Hence, the system may choose to prioritize the processing of such queries to compensate.

Using these client-specific QOS functions, the proposed system can attempt to maximize net QOS for all clients. To do this, it may create batches of scans to execute in serial order, with each batch defined by which column blocks of which horizontal partition to scan, along with what queries to evaluate on each scan. In this it is subject to three hard constraints: 1) it cannot batch a set of queries for a specific horizontal partition that would require more than the available amount of memory available to the compute device to evaluate; 2) it must preserve a serializable order of evaluation of queries across all horizontal partitions such that any two queries over any two partitions will not be executed in inconsistent ways (i.e. query 1 would write a result that was then read by query 2 for partition A and query 2 would read a value that was then written to by query 1 for partition B); and 3) it must preserve the read-write ordering for any transaction blocks sent from a client that consist of more than one query (i.e. remove 10% of the value of User A's account, and then deduct 10% of the value from User A's account and place it in User B's account). Note that in the case of all read queries, queries can be evaluated in any order whatsoever as there are no dependencies.

The optimizer may keep a list of all outstanding horizontal partitions and the constituent columns that need to be scanned to satisfy each outstanding query in the system. It also contains a sophisticated cost model generator—combining knowledge of the specific architectural details of the target compute device (i.e. sizes of each level of cache, instruction cycles required per operation, etc.) with statistics regarding the data distribution of each column of each horizontal partition to accurately predict execution time for any batch of queries for any horizontal partition. When possible, it evaluates all possible mappings of queries to query batches and sequential ordering of those batches to determine the mapping and ordering that maximizes the QOS function—using the large computational throughput of the MANYCORE devices themselves to decrease the time needed to evaluate all such mappings. However, such calculations can quickly become intractable due to the combinatorial explosion of batching and ordering possibilities as the number of outstanding queries increases, so various heuristic shortcuts can be taken when needed, such as automatically batching queries with the exact same query plan (a common case for certain visualization and analytics workloads, for example, the generation of time histograms for a certain geographical region), and using evolutionary methods to generate the best possible solution (if not the absolutely most optimal) within a certain time budget. The actual method here is not particularly important—just that the optimizer can modularly support different optimization frameworks. What is critical is that transactions involving updates with inter-dependencies must be executed deterministically, i.e. always in the same order given the same queries. This is vitally important for the functioning of a distributed architecture for the proposed system, as outlined below. Also, pushing updates first allows for the read-only transactions to be non-deterministically scheduled since, so scheduled, they will not interleave with writes. Finally, pushing updates first can both ensure the freshest possible values for later read-only transactions and reduce global memory traffic by allowing successive writes to the same fields of data to occur in local/register memory, with only the final value of that field after all updates are applied being written back to global memory.

The scheduler can also take advantage of the fact that certain parts of different query plans might be identical, which is often the case when a single client is executing different queries to generate different visualizations for a common time and geographic range. For example, the proposed system may, for every user input, ask the backend of the proposed system for a time histogram, point map, heat map, top K words and result set for all tweets within a particular geographic bounding box over a particular time range. The scheduler will realize that the predicate for each of these queries (i.e. "WHERE time>t0 AND time<t1 AND x>x0 AND x<x1 AND y>y0 AND y<y1", where t0, t1, x0, x1, y0, and y1 are actual scalar values) is the same, and will evaluate the predicate only once per horizontal partition.

It should be noted that the proposed system can also create shared workloads for animation queries, by generating all frames in batch, and by doing speculative execution, combining a user's query history with lightweight machine learning based on their and other users previous query history to help guess the next queries they might generate— adding them to the same scan.

Execution

An approach to execute a query would be to launch a function for every operator that makes up an Abstract Syntax Tree (AST)—however such an approach is prohibitively expensive for several reasons. First, for every operator in the tree, the result of a node must be written out to global memory only to be read back in from global memory by the next operator in the tree. Given that we already know that global memory bandwidth is typically the bottleneck in our system, such an approach is going in the wrong direction. Second, memory is in limited supply on a given compute device, so having to store potentially many intermediate columns for every query being evaluated will cut down the number of queries that can be evaluated simultaneously without running out of memory. Finally, the overhead required to launch functions (often termed kernels) on MANYCORE devices is typically much greater than it is on traditional CPUs, often amounting to tens of microseconds—which can quickly add up to a significant portion of query evaluation time when a kernel must be launched for each horizontal partition touched by a query, and then for each operator in the query's AST tree.

To address this, the proposed system can execute queries in a number of ways, for instance, by pre-compiling them or executing them inside a virtual machine running on the targeted compute device. Compilation will typically lead to the fastest functions with the least overhead, but of course requires the up-front cost of compiling the function (afterwards the compiled function can be stored in-memory and even persisted on disk in a query plan library), which can be on the order of a second or more. Thus the proposed system can optionally adopt a strategy of not compiling a given query plan until it has seen it a certain number of times within the last "Q" queries, which if past query history is any guide to future query workloads, will suggest that the up-front cost of compilation can be amortized over all future identical query workloads. However, such an approach becomes less fruitful when the proposed system is set to execute shared scans—the likelihood that the system will encounter an identical set and ordering of query plans batched into one shared scan becomes increasingly unlikely as the number of incoming queries increases. There is one case where compiling a set of shared scans might still be fruitful though, and that is when a single user or multiple users are generating repeated sets of identical queries, typically generated by queries coming from a data dashboard/interface. Finally, the proposed system can decide to compile partial query plans if these partial plans are seen repeatedly. It then might execute the remainder of the query plan using the one kernel per AST operator as described above.

The other approach is to execute query plans using a special purpose virtual machine programmed into the target device. This virtual machine is able to decode a set of instruction sequences, along with references to the locations of necessary data, at run-time. Shared query plans can be specified as multiple vectors of instruction streams. These instruction sequences include but are not limited to the operators needed to implement SQL. While such an approach might sound computationally expensive, note that there is no divergence between threads of the computational device, as each thread will be following the same query plan in lock step with other threads in its group (i.e. warp on NVIDIA GPU devices). Moreover, as described above, the vast difference between computational and memory bandwidth (the "computational headroom") of such devices typically means that the additional "control" cycles required by each thread in this setup may have little or no adverse performance effects.

Finalizing Queries.

The proposed system both supports storing and returning data as both relational data and matrices. Matrices are defined as tables with a given dimensionality and size and optionally with implicit values along each dimension (for example—a heat map of average temperature over an area can be thought of as a table of temperature with implicit values of x and y governed by the each elements row and column position. The proposed system optimally allocates matrix data in the memory of Multicore devices so as to coalesce accesses to this data along cache lines. The proposed system also allows convolutional filters to be applied to data in matrix format, for example a Gaussian Blur filter or an edge detecting filter. Streams of matrix data can be represented as H.264 video and sent to the browser interactively, or alternatively, saved to file in any video format Relational data can be returned in binary, JSON, or XML format, among others while matrix data (i.e. the result of a histogramming operation) can be returned either sparsely (i.e. using run-length or block-level encoding or densely, in binary, JSON, as well as various image formats (such as Jpeg or PNG).

Our system also can adapt to how "thick" or "thin" a client is, as well as the quality of connection between the client and server. It may take load off the server for example, to allow a client using OPENGL or WEBGL to do its own convolutional filters (i.e. blur) on data in matrix format rather than doing it server side. Alternatively, when there is a low bandwidth connection between client and server, it may be advantageous to do heavy compression on the server before sending the result to the client.

Transactions and ACID Compliance.

FIG. 2 is a flowchart illustrating a method of logging update queries according to one embodiment of the present invention. FIG. 3 is a flowchart illustrating a method of flushing one or more pages of memory to stable storage according to one embodiment of the present invention. FIG. 4 is a flowchart illustrating a method of writing dirty pages to memory according to one embodiment of the present invention.

Referring now to FIGS. 2, 3 and 4, the proposed system can optionally be configured as an ACID-compliant system, although without the heavy logging overhead typically associated with such systems. ACID compliance implies, in the face of incoming transactions that make writes and reads to the database: atomicity, consistency, isolation and durability. The remainder of the properties are guaranteed by a logging and file writing protocol that follows:

1. At initialization of the database (i.e. the first time it is run) an integer "epoch" counter is set to 0 and "CHECKPOINT 0" is flushed to disk 210. Queries are then continuously received and queued 212 as indicated by the dashed line in the Figure.

2. The following occurs in a loop, one for each "cycle" of query processing of a set of queries:

A. Evaluate the queries that have been queued since the last cycle 214. As queries are evaluated, a check is performed to determine if all pages needed for evaluation are in the buffer pool 214:

a. If any of the pages needed for evaluation are not in the buffer pool 216, read the page defined by PAGE_ID to which is appended the largest epoch sub-key 218. The queries queued since the last cycle or epoch are then executed 220. The queries executed are checked to determine if any of the queries or transactions executed over a horizontal partition involve writes (updates) to that partition 222.

b. If any of the transactions executed over a horizontal partition involve writes (updates) to that partition 228, a Boolean dirty flag is set in the MANYCORE device's memory for each column that was edited 230.

B. At the end of executing all outstanding queries for a particular cycle, all queries that are updates that were executed in that cycle are recorded in a log file 232. Any variables that are evaluated at runtime, such as the SQL 'NOW', are replaced with the actual values they had at run-time (i.e. "NOV 19 2013 10:34:33 AM") 234. "COMMIT" is written to the log file 236.

C. This log file is then flushed to stable storage 236, signifying a commit of those queries. The method waits for the start of the next epoch/cycle 238 and continues at step 214 for a new epoch/cycle.

D. Pages flagged as dirty are monitored for the need to flush the page to stable storage 310. At any time during the cycle of steps 214-238, if a page of memory flagged as dirty needs to be flushed to stable storage for whatever reason 312 (typically if the buffer pool needs to evict it to bring in another page, at checkpoints (described below), or in the case of asynchronous writes of dirty pages to disk (described below), the system does not overwrite the existing page of memory on disk (hereby called the stable page) but rather writes a shadow copy of that page alongside the stable copy 314. The shadow copy is written to the file designated by the filename: value of PAGE_ID appended with the epoch sub-key of epoch+1 314.

E. At any time during the cycle of steps 214-238, at periodic or occasional checkpoints, the system checks to see if after all queries are evaluated for that cycle 410, if not 412 continues at step 410, and if so 412 executes the following steps in sequential order:

a. a check is made for dirty pages 414 and if none are located 416, the method continues at step 426. If any dirty pages are located 416, all dirty pages in the buffer pool are flushed to disk in the shadow copy approach outlined above 418-424.

b. The epoch counter is then incremented by 1 426.

c. CHECKPOINT and the value of the epoch counter are flushed to stable storage 428. The method continues at steps 410-412 which will wait until all queries are executed in the next epoch or cycle before continuing to step 414.

Optionally as a performance improvement:

A. Pages dirtied by previous queries that will not be touched during the current cycle of queries can be asynchronously flushed to stable storage. This will help minimize the amount of blocking storage writes that need to occur at the time of CHECKPOINT.

B. The system can monitor the number and aggregate size of dirty pages in memory, and if due to the method described above, the number/size reaches 0 or alternatively, goes below some threshold, the system can invoke the CHECKPOINT protocol. This will help ensure that the blocking work done at CHECKPOINTS is kept to a minimum.

C. Periodically, old versions of pages in storage (with epoch_subkey less than the maximum epoch_subkey for any version of the page that has an epoch_subkey less than or equal to the current epoch counter If the system crashes, or alternatively, a cycle of queries fails to successfully complete for whatever reason (called a "failure"), the following protocol is initiated to recover:

A. The log file is scanned backwards until arriving at the last successful CHECKPOINT. The value of the epoch counter is set to whatever value follows CHECKPOINT in the log file. Since the database has always operated according to the cycle loop described above protocol, the database as it was at the point of the last checkpoint should be represented by all database files with the filenames of PAGE_ID followed by the greatest epoch subkey that does not exceed the epoch counter, i.e. (Max(epoch_subkey) |epoch_subkey<epoch)

B. All queries recorded in the log file are then "played forward" or executed again, being grouped into cycles that are delimited by COMMIT statements. Since the scheduler is deterministic for transactions involving updates and all non-deterministic values in the queries have been replaced by their instantiated values as generated at the previous, pre-failure runtime (as specified in step 4), the database, after executing all cycles up to the final COMMIT statement, will be in exactly the state it was pre-failure.

The protocol described above has the following advantages over the traditional ARIES-style logging/recovery protocol.

A. The overhead of logging is kept to a minimum. ARIES-style logging keeps track of every update made to every row in the database, including storing the pre- and post-update values for each update of each column. If done on a MANYCORE device, this involves the following overheads:

a. For each column of each row being updated—space must be reserved to store the pre and post-values. Due to the parallel nature of MANYCORE devices it can be costly to densely pack this data (i.e. only storing the row ids and update data for the rows that are updated), so likely space would need to be pre-reserved for each row for each column being updated.

b. If there are updates that update a large proportion of the total rows of a table (quite likely in OLAP workloads where updates are often used to perform data transformations on all rows), the extra memory traffic to record these updates may be much greater than the traffic needed simply update the columns.

c. These update streams then can be transferred back to Host (i.e. CPU) memory, competing with actual query result sets for the already limited bandwidth across the PCI bus. This has to be done at the end of each and every cycle.

d. All of these updates, comprising potentially billions of rows, need to be written to log and flushed to stable storage The proposed system is able to avoid these costs because of the following conditions are met, inherent in its unique task-sequential, massively data-parallel approach.

A. Rollbacks of one transaction are infrequent or never occur at all. Because execution is serialized, there are no deadlocks that can occur between two threads vying for locks held by the other. Handling rollbacks without going back to the last CHECKPOINT is one of the main motivations for tuple-based update logging.

B. Since everything is effectively serialized, and the scheduler is deterministic, we can allow for precise recoveries by simply replaying query history. This is not the case with typical multithreaded database systems, which involve non-deterministic ordering of transactions.

C. Because the whole architecture is built for maximum performance—hundreds or thousands of full-table scan queries could be replayed in milliseconds, lessening the potential downside of not allowing granular ROLLBACKS (note that in our system, we can do ROLLBACKS, but have to do them by going back to the last CHECKPOINT and re-executing all subsequent committed queries except for the one being rolled back).

SUMMARY

Described is a method of storing data, including:
evaluating queries that have been queued since a prior cycle;

responsive to any of the pages needed for evaluation not in a buffer pool, reading a page defined by a PAGE_ID to which is appended the largest epoch sub-key;

executing the queued queries;

responsive to any queries executed over a horizontal partition involving writes or other updates to that partition, setting a Boolean dirty flag in a MANYCORE device's memory for each column that was updated;

at the end of executing all outstanding queries for a particular cycle, recording in a log file all queries that are updates that were executed in that cycle;

replacing any variables that are evaluated at runtime, with actual values they had at time of execution;

writing "COMMIT" to the log file and flushing the log file to stable storage in a tangible computer media, signifying a commit of those queries;

at any time during the epoch, if a page of memory flagged as dirty is determined to require flushing to stable storage, writing a shadow copy of that page alongside the stable copy without overwriting an existing stable page of memory on disk, by writing the shadow copy using a filename comprising a value of PAGE_ID appended with the epoch sub-key of epoch+1;

at any time during the cycle after all queries are evaluated for that cycle at periodic or occasional checkpoints, executing the following steps in sequential order:
 (i) all dirty pages in the buffer pool are flushed to disk in the shadow copy approach outlined above;
 (ii) The epoch counter is then incremented by 1; and
 (iii) "CHECKPOINT" and the value of the epoch counter are flushed to stable storage; and
 identifying a beginning of a new epoch.

If the system crashes, or alternatively, a cycle of queries fails to successfully complete for whatever reason (called a "failure"), the following protocol is initiated to recover:

A. The log file is scanned backwards until arriving at the last successful CHECKPOINT. The value of the epoch counter is set to whatever value follows CHECKPOINT in the log file. Since the database has always operated according to the cycle loop described above protocol, the database as it was at the point of the last checkpoint should be represented by all database files with the filenames of PAGE_ID followed by the greatest epoch subkey that does not exceed the epoch counter, i.e. (Max(epoch_subkey) |epoch_subkey<epoch)

B. All queries recorded in the log file are then "played forward" or executed again, being grouped into cycles that are delimited by COMMIT statements. Because the scheduler is deterministic for transactions involving updates and all non-deterministic values in the queries have been replaced by their instantiated values as generated at the previous, pre-failure runtime (as specified in step 4), the database, after executing all cycles up to the final COMMIT statement, will be in exactly the state it was pre-failure.

All references to the system include the method and vice versa.

All system terms are to be interpreted as structural: the only nonce term to be used in the claim is "means".

What is claimed is:

1. A method of logging update queries in a computer media, comprising:
 evaluating queries that have been queued since a prior cycle;
 responsive to any pages needed for evaluation not in a buffer pool, reading at least one page comprising a PAGE_ID and a largest epoch sub-key;
 executing the queued queries;
 responsive to any queries executed over a horizontal partition involving writes or other updates to that partition, setting a Boolean dirty flag in a MANYCORE device's memory for each column that was updated;
 after executing all outstanding queries for a particular epoch, recording in a log file all queries that are updates that were executed in that epoch, replacing any variables that are evaluated at runtime, with actual values they had at time of execution; and
 signifying a commit to the log file and flushing the log file to stable storage.

2. The method of claim 1, additionally comprising, at any time during the epoch, when a page of memory flagged as dirty is determined to require flushing to stable storage, writing a shadow copy of that page alongside a stable copy without overwriting an existing stable page of memory on disk.

3. The method of claim 2, wherein the writing the shadow copy comprises writing the shadow copy using a filename comprising a value of PAGE_ID appended with the epoch sub-key of epoch+1.

4. The method of claim 2, additionally comprising, at any time during a cycle after all queries are evaluated for that cycle at periodic or occasional checkpoints:
 executing the following steps in sequential order:
  (i) flushing to disk all dirty pages in the buffer pool;
  (ii) incrementing an epoch counter; and
  (iii) flushing a value of the epoch counter to stable storage; and
 identifying a beginning of a new epoch.

* * * * *